3,732,316
PROCESS FOR PRODUCING METHYL PHOSPHINE OXIDES

Kingso Chingtsung Lin, Newark, Ohio, assignor to Hooker Chemical Corporation, Niagara Falls, N.Y.
No Drawing. Filed Nov. 12, 1970, Ser. No. 89,103
Int. Cl. C07f 9/50
U.S. Cl. 260—606.5 P                    5 Claims

ABSTRACT OF THE DISCLOSURE

Methyl phosphine oxides are prepared by thermal isomerization of the corresponding hydroxymethyl phosphines. The products find utility as fire retardant additives for organic polymers such as polyurethane foams and polyesters, and as intermediates for the production of surfactants, plasticizers, fire retardant polymers, and generally as oxidation stabilizers for use in lubricating oils, hydraulic fluids and organic polymers.

BACKGROUND OF THE INVENTION

The thermal isomerization of certain phosphorus containing organic compounds is known. For example, tertiary phosphites have been thermally isomerized to produce the corresponding phosphonate derivatives. Likewise, phosphinite derivatives have been isomerized to produce phosphine oxides. In both instances, the isomerization reaction involved the displacement of a P—O—C linkage to form the $$\overset{O}{\underset{\|}{P}}-C$$

group.

BRIEF DESCRIPTION OF THE INVENTION

In accordance with this invention there is provided a process for the production of bis(hydroxymethyl)methylphosphine oxide which comprises heating tris(hydroxymethyl)phosphine at a temperature and for a time sufficient to isomerize tris(hydroxymethyl)phosphine to form bis(hydroxymethyl)methylphosphine oxide.

The isomerization reaction of the instant invention is conducted at a temperature between about 120–250 degrees centigrade. Preferably, temperatures between about 140–210 degrees centigrade are employed. At temperatures as low as 120 degrees centigrade, the time required for completion of the isomerization reaction is correspondingly greater and at a temperature above 250 degrees centigrade, decomposition of the product increases sufficiently to exclude those temperatures for all practical purposes.

DETAILED DESCRIPTION OF THE INVENTION

Tris(hydroxymethyl)phosphine has been regarded as a hazardous material because of its lability, leading to explosions upon heating. It has been discovered that the explosive property of tris(hydroxymethyl)phosphine is in essence an exothermic oxidative isomerization reaction, which if properly controlled, produces bis(hydroxymethyl)methyl phosphine oxide in excellent yields.

Thus, although tris(hydroxymethyl)phosphine decomposes quite rapidly at elevated temperatures in the absence of the temperature moderating influence of a solvent, it has been found that in the presence of a solvent such as dimethylsulfoxide, acetic acid, N-methyl pyrrolidone, N,N-dimethyl formamide, and the like, the conversion to bis(hydroxymethyl)methyl - phosphine oxide is smoothly conducted to afford the product in quantitative yields.

The product of the thermal isomerization of tris(hydroxymethyl)phosphine, containing predominately bis(hydroxymethyl)methylphosphine oxide exhibits excellent flame retardant properties. Furthermore, the product is an intermediate for the preparation of surfactants and fabric softeners of the type $$(ROCH_2)_2\overset{O}{\underset{\|}{P}}CH_3 \text{ and } (R_2NCH_2)_2\overset{O}{\underset{\|}{P}}CH_3$$

in which R is alkaryl or alkyl, in which the alkyl group contains from 8 to 18 carbon atoms, or $$H(OCH_2CH_2)_n$$

in which $n$ is from 5 to 20, which derivatives may be prepared by known methods.

Although applicants do not wish to be bound by any specific theory, it is believed that the very rapid decomposition of tris(hydroxymethyl)phosphine observed in the preparation of tris(hydroxymethyl)phosphine from tris(hydroxymethyl)phosphonium chloride represents an acid catalyzed exothermic oxidation leading to the formation of a carbonium ion intermediate, such as, $$P\overset{+}{C}H_2 \longrightarrow \overset{+}{P}=CH_2$$

EXAMPLE 1

Isomerization of tris(hydroxymethyl)phosphine in dimethyl sulfoxide

To 100 milliliters of dimethyl sulfoxide in a round bottom flask equipped with a reflux condenser, was added 29.5 grams of tris(hydroxymethyl)phosphine. The solution was heated to between 160–165 degrees centigrade to initiate the reaction. The dimethyl sulfoxide solvent was refluxed in the reflux condenser to dissipate the heat of the exothermic isomerization. After the reaction had gone to completion as noted by the cessation of refluxing dimethyl sulfoxide, the solvent was distilled gradually to yield 11.3 grams of a long needled crystalline material have a boiling point at 170–174 degrees centigrade at 0.1 millimeter mercury absolute and a melting point of 94–98 degrees centigrade. This crystalline material was determined to be bis(hydroxymethyl)methyl phosphine oxide.

A low boiling dimethyl sulfide fraction of the distillate having a distinctive odor demonstrated that some of the oxygen from the dimethyl sulfoxide solvent had been extracted by the tris(hydroxymethyl)-phosphine. Nuclear magnetic resonance data obtained from the product demonstrated that 60% of the product was bis(hydroxymethyl)methyl phosphine oxide and 40% of the product was tris(hydroxymethyl)phosphine oxide.

EXAMPLE 2

The procedure of Example 1 is repeated with the exception that tris(hydroxymethyl)phosphine was added portionwise to a solution of dimethyl sulfoxide at 165 degrees centigrade in an attempt to prevent the extraction of oxygen from dimethyl sulfoxide with the formation of dimethyl sulfide. The isomerization of tris(hydroxymethyl)phosphine gave bis(hydroxymethyl)methyl phosphine oxide in 100% conversion. This result was established by the titration of the tris(hydroxymethyl)phosphine content in the reaction product with iodine which demonstrated that only a trace amount of tris(hydroxymethyl)phosphine remained in the product. Phosphorus 31 nuclear magnetic resonance data for tris(hydroxymethyl)phosphine shows a +24.1 p.p.m. chemical shift employing 85% phosphoric acid as a reference, whereas the thermally rearranged product gave an approximate −50 p.p.m. chemical shift using 85% phosphoric acid as the reference, indicating the presence of a phosphine oxide. The infrared spectrum of the rearranged product showed a strong absorption band at 1160 reciprocal centimeters indicating the presence of the P=O bond and at 1300 reciprocal centimeters for a P—CH₃ characteristic absorption band. These two bands are absent in the infrared spectrum of tris(hydroxymethyl)phosphine. The C—O absorption band for hydroxymethyl phosphine generally shows in the region of 1010–1020 reciprocal centimeters, but the rearranged hydroxy methyl-methyl phosphine oxides consistently shift to higher frequencies in the range of approximately 1050 reciprocal centimeters. This C—O absorption band shift is also observed in other alkyl hydroxy methyl phosphine oxides. The rearranged product does not clean tarnished silver, demonstrating the absence of trivalent phosphorus material.

EXAMPLE 3

Assuming that the intermediate of the thermal rearrangement of tris(hydroxymethyl)phosphine to bis(hydroxymethyl)methyl phosphine oxide is

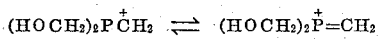

the presence of an acid would favor the isomerization. Therefore tris(hydroxymethyl)phosphine was refluxed in acetic acid for 7 hours. The acetic acid was distilled off under reduced pressure and it was determined that an amount of acetic acid had been consumed which was equivalent to the tris(hydroxymethyl)phosphine on a molar to molar basis. The liquid product was distilled to give a product with a boiling point between 120–170 degrees centigrade at 0.5 millimeter of mercury absolute which constituted an 80% yield based upon the hypothetical structure

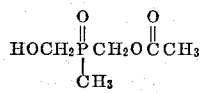

Nuclear magnetic resonance spectroscopy demonstrated the presence of various phosphorus compounds in the product. The structures of the main product constituents were determined by infrared spectroscopy. The structures of these compounds appear as:

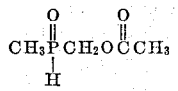

boiling point 69–100° C./0.35 mm. Hg abs. $n_D^{25}$ —1.4740.

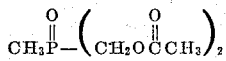

boiling point 100–120° C./0.35 mm. Hg abs. $n_D^{25}$ 1.4748.

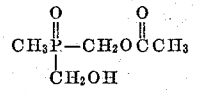

boiling point 120–165° C./0.35 mm. Hg abs. $n_D^{25}$ 1.4700.

EXAMPLE 4

A solution of tris(hydroxymethyl)phosphine (324 grams, 2.54 moles) containing 22% tris(hydroxymethyl)phosphine oxide, and 200 milliliters of N-methyl pyrrolidone, was added dropwise to 240 milliliters of N-methyl pyrrolidone at about 170–175 degrees centigrade during a two hour period. The solution was heated for an additional 4 hours after completion of the introduction of tris(hydroxymethyl)phosphine (subsequent experiments demonstrated that heating for about 1 hour is sufficient to insure complete reaction). The solvent was stripped off by heating on a steam bath under reduced pressure to yield 326 grams of a thick liquid product. Phosphorus nuclear magnetic resonance analysis of the liquid product indicated that it contained between 78–79% of bis-(hydroxymethyl)methyl phosphine oxide and between 21–22% of tris(hydroxymethyl)phosphine oxide, the two components demonstrating the chemical shift based upon 85% phosphoric acid as the reference equal to —50.4 p.p.m. and —47.4 p.p.m., respectively.

*Analysis.*—Calculated for C₃H₉PO₃ (percent): C, 29.04; H, 7.31; P, 25.00. Found (percent): C, 30.16, H, 7.33; P, 23.59.

Esterification of 93.6 grams (0.74 mole) of the rearranged product with 173.7 grams of acetic anhydride, 100 grams of acetic acid and 3.1 grams of anhydrous sodium acetate gave 94 grams (61%) of bis(acetoxymethyl)methyl phosphine oxide (CH₃COOCH₂)₂P(O)CH₃, exhibiting a boiling point of 145–160 degrees centigrade at 0.3 millimeter mercury absolute and 28 grams (20%) of tris(acetoxymethyl)phosphine oxide exhibiting a boiling point of 160–175 degrees centigrade at 0.3 millimeter mercury and having a melting point of 45–55 degrees centigrade. Redistillation of the acetate of bis(hydroxymethyl)methyl phosphine oxide yielded a product exhibiting a boiling point of 145–147 degrees centigrade at 0.3 millimeter mercury absolute; the refractive index of $n_D^{25}$ equals 1.4658, phosphorus nuclear magnetic resonance demonstrated a chemical shift to —40.3 p.p.m. (referred to H₃PO₄); and an acetate of tris(hydroxymethyl)phosphine oxide exhibiting a boiling point of 175–179 degrees centigrade at 0.3 millimeter mercury absolute; having a melting point between 50–55 degrees centigrade.

*Analysis.*—Calculated for (CH₃COOCH₂)₂P(O)CH₃ (percent): C₇H₁₃O₅P, C, 40.39; H, 6.29; P, 14.88. Found (percent): C, 40.15; H, 6.41; P, 15.09.

*Analysis.*—Calculated for (CH₃COOCH₂)₃P(O) (percent): C₉H₁₅PO₇, C, 40.64; H, 5.68; P, 11.95. Found (percent): C, 39.85; H, 5.89; P, 11.95.

EXAMPLE 5

Heating bis(hydroxymethyl)methyl phosphine oxide at temperatures higher than 230° C. resulted in a series of complicated reactions. For instance, the isomerized bis-(hydroxymethyl)methyl phosphine oxide containing product of Example 2 was subjected to distillation under reduced pressure of 0.1–0.3 millimeter mercury absolute at an ultimate temperature of 230 degrees centigrade to afford the following products.

(1) Distillate: (30% of the starting material) a mixture of various phosphorus compounds, boiling point 120–160 degrees centigrade at 0.1–0.3 millimeter mercury absolute. These compounds appear to be the decomposition products of bis(hydroxymethyl)methyl phosphine oxide.

(2) Residue: (50% of the starting material) a dimer-resinous material,

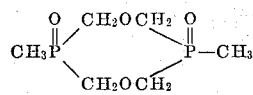

Molecular weight: Calculated—212. Found—209.

(3) Distillate trap: (20% of the starting material) water and formaldehyde.

The dimer of (2) is soluble in water and is intumescent upon the application of flame. The infra-red spectrum of the decomposed product of (1), which is carried out of the distillation flask with the formaldehyde and water of (3), displayed several complicated P—H absorption bands. It was believed that the major product of this distillate was of the formula

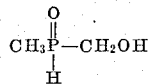

EXAMPLE 6

The rearranged product of isomerization of tris(hydroxymethyl)phosphine (THP) containing 75% bis(hydroxymethyl)methyl phosphine oxide and 25% tris(hydroxymethyl)phosphine oxide when employed as an additive in the production of polyurethane foam afforded a polyurethane foam product which did not burn upon direct contact with flame.

Bis(hydroxymethyl)methyl phosphine oxide when used as an additive for polyurethane foams and compared to $(C_2H_5O)_2P(O)CH_2N(CH_2CH_2OH)_2$ diethyl N,N - bis(2-hydroxyethyl)aminomethylphosphonate in accordance with ASTM Test 1692, afforded the following results. The same polyurethane foam material with diethyl N,N-bis(2-hydroxyethyl)aminomethylphosphonate and bis(hydroxymethyl)methyl phosphine oxide was studied for hydrolytic stabilities at 70 degrees centigrade, at one week's exposure and 100% relative humidity to afford the results indicated in the following table:

| THP isomerization product, parts | Polyurethane, parts | ASTM Test 1692, fire retardant | Hydrolytic stability at 70° C., 1 week, 100% relative humidity |
|---|---|---|---|
| $CH_3P(O)(CH_2OH)_2$: | | | |
| 5 | 95 | Self-extinguishing | Good. |
| 10 | 90 | Non-burning | Do. |
| $(C_2H_5O)_2P(O)CH_2N(CH_2CH_2OH)_2$: | | | |
| 5 | 95 | Not self-extinguishing | Do. |
| 10 | 90 | Self-extinguishing | Do. |
| 20 | 80 | Non-burning | Do. |

This comparative data demonstrates that the isomerization product of this invention is approximately twice as effective as the known fire retardant additive for polyurethane foams, providing a non-burning product of good hydrolytic stability with 10 parts of additive.

What is claimed is:

1. A process for the production of a methyl phosphine oxide which comprises heating a hydroxymethyl phosphine, in an inert polar solvent, at a temperature and for a time sufficient to isomerize the hydroxymethyl phosphine to form a methyl phosphine oxide.

2. The process of claim 1 in which said hydroxymethyl phosphine is heated to a temperature from about 120 to about 250 degrees centigrade to form said methyl phosphine oxide.

3. The process of claim 1 wherein said polar solvent has a boiling point from about 120 to about 250 degrees centigrade.

4. A process for the production of bis(hydroxymethyl) methyl phosphine oxide which comprises heating tris(hydroxymethyl)phosphine, in an inert polar solvent, at a temperature and for a time sufficient to produce bis(hydroxymethyl)methyl phosphine oxide.

5. The process of claim 4 in which the temperature is from about 120 to about 250 degrees centigrade.

References Cited

UNITED STATES PATENTS

| 3,030,421 | 4/1962 | Reuter et al. | 260—606.5 P |
| 3,242,217 | 3/1966 | Hamman et al. | 260—606.5 P |
| 3,248,429 | 4/1966 | Baranauckas et al. | 260—606.5 P |
| 3,309,408 | 3/1967 | Moedritzer | 260—606.5 P |
| 3,346,647 | 10/1967 | Garner | 260—606.5 P |
| 3,404,187 | 10/1968 | Kober et al. | 260—606.5 P |

WERTEN F. W. BELLAMY, Primary Examiner

U.S. Cl. X.R.

260—2.5 AJ, 2.5 AM; 252—49.8